United States Patent [19]
Fujisawa

[11] Patent Number: 6,014,294
[45] Date of Patent: Jan. 11, 2000

[54] DISC CARTRIDGE WITH CLEARANCE GROOVE

[75] Inventor: Hirotoshi Fujisawa, Tokyo, Japan

[73] Assignee: Sony Corporation, Tokyo, Japan

[21] Appl. No.: 07/979,627

[22] Filed: Nov. 19, 1992

[30] Foreign Application Priority Data

Nov. 28, 1991 [JP] Japan ................................. 3-338026

[51] Int. Cl.$^7$ .................................................. G11B 23/03
[52] U.S. Cl. .......................................... 360/133; 369/291
[58] Field of Search ................................ 360/132, 133; 369/291; 206/387, 444, 308.3, 308.1

[56] References Cited

U.S. PATENT DOCUMENTS

| | | | |
|---|---|---|---|
| 4,614,990 | 9/1986 | Saito | 360/133 |
| 4,682,322 | 7/1987 | Ohta | 360/133 |
| 4,694,448 | 9/1987 | Tamaru et al. | 360/133 |
| 4,736,357 | 4/1988 | Uehara et al. | 360/133 |

FOREIGN PATENT DOCUMENTS

| | | | |
|---|---|---|---|
| 60-143491 | 7/1985 | Japan | 360/133 |
| 63-46669 | 2/1988 | Japan | 360/133 |

*Primary Examiner*—David D. Davis
*Attorney, Agent, or Firm*—Limbach & Limbach L.L.P.

[57] ABSTRACT

A disc cartridge is provided which may be positively loaded in position on cartridge loading section within a recording and/or reproducing apparatus and in which a cartridge main body may be fabricated easily. The disc cartridge is provided with a cartridge main body in which a disc for recording information signals, a shutter member movably mounted on the cartridge main body, and a groove into which may be introduced a shutter opening member is adapted for opening the shutter member and which is provided on the cartridge main body along the direction of movement of the shutter member. A clearance is formed in the groove for clearing the shutter opening member.

5 Claims, 7 Drawing Sheets

DISC CARTRIDGE WITH CLEARANCE GROOVE

BACKGROUND

1. Field of the Invention

This invention relates to a disc cartridge comprised of a cartridge main body and a disc, such as an optical disc, which is housed therein and which is capable of recording information signals, such as music or video signals. More particularly, it relates to such a disc cartridge in which a shutter member is moved in a direction parallel to the direction of insertion of the disc cartridge into a recording/reproducing apparatus for opening or closing an opening formed in the cartridge main body.

2. Background of the Invention

The disc cartridge has hitherto been employed which is comprised of the cartridge main body and a disc, such as an optical disc or a magneto-optical disc, which is housed therein and which is capable of recording information signals, such as music or video signals.

There has been proposed the disc cartridge of the above kind in which a shutter member for closing an aperture formed in the disc cartridge for radially exposing at least a part of a signal recording region of the disc, housed within the cartridge main body exposed to the outside, is moved in a direction parallel to the direction of inserting the disc cartridge into the recording/reproducing apparatus for opening or closing the aperture. Above mentioned disc cartridge D1, as shown in FIGS. 1 and 2, include a cartridge main body accommodating an optical disc or a magneto-optical disc. The cartridge main body is comprised of an upper half 1 and a lower half 2 abutted and connected to each other.

At a mid part on the lower surface of the cartridge main body 3 housing the disc table of a disc rotating and driving device may be intruded for rotating the disc 4 when the disc cartridge D1 is loaded in the recording and/or reproducing apparatus. The opening 5 is faced by the rim of a center opening 4a of the disc 4 and a magnet-clamping magnetic plate 4b attached to the disc 4 for closing center opening 5.

The upper and lower surfaces of the cartridge main body 3 are formed with signal recording/reproducing apertures 6, 7 for exposing at least a part of the signal recording region of the disc 4 accommodated therein to the outside. These signal recording/reproducing apertures 6, 7 are rectangular in contour and disposed at the transversely mid position of the cartridge main body 3 for extending from a position proximate to the opening 5 to a position reaching the front side of the cartridge main body 3.

A shutter member 8 for opening and closing the signal recording/reproducing aperture 6, 7 is mounted for movement on the cartridge main body 3. The shutter member 8 is formed by punching and bending a metal plate, such as a thin stainless steel plate, and in the shape of a letter U. The shutter member includes shutter sections 8a, 8b for closing the apertures 6, 7, and connecting web 8c connecting the shutter sections 8a,8b to each other. First and second movement guide section 9, 10 in the form of a letter U are formed adjacent to both ends of the connecting web 8c of the shutter member 8 for stable guidance of the shutter member 8 in a direction parallel to the front side of the cartridge main body 3. Extrication proof guide lugs 11, are formed by bending a part of the first and second movement guide sections 9, 10.

The shutter member 8, arranged as above, is fitted on the front side of the cartridge main body 3 as shown in FIGS. 1 and 2, with the shutter sections 8a, 8b extending over the signal recording/reproducing apertures 6, 7. At this time, extrication-proof guide lugs 11, 11 are engaged with extrication-proof guide grooves 12 formed in the cartridge main body 3, while the first and second movement guides 9, 10 are fitted on the front end face of the lower half 2. The shutter member 8 is prevented from being extricated from the cartridge main body 3 and from being wobbled by the first and second movement guide sections 9, 10 as the shutter member is moved in the thus stabilized state in the directions shown by arrows A and B in FIG. 1 of opening or closing the signal recording/reproducing apertures 6, 7.

A locking member 13 is arranged within the cartridge main body 3 for holding the shutter member 8 in the position of closing the signal recording/reproducing apertures 6, 7 when the shutter member 8 has reached the position of closing the signal recording/reproducing apertures 6, 7. The locking member 13 is comprised of a proximal part 13a pivotally mounted within the cartridge main body 3 and a resiliently flexible locking arm 13b extended from the proximal part 13a. The locking arm 13b has an engaging recess 15 engaged by a mating locking member 14 formed by bending a part of the first movement guide section 9 of the shutter member 8. When the shutter member 8 closes the signal recording/reproducing apertures 6, 7, the shutter member is locked in the close position by the mating locking member 14 engaged with the engaging recess 15.

The front side of the cartridge main body 3 along which is moved shutter member 8 is formed with a groove 16 for unlocking the locking member 13 which locks the shutter member 8 in the aperture closing position and for being engaged by a shutter opening member arranged in the recording and/or reproducing apparatus for moving the shutter member 8 in the direction of opening the signal recording/reproducing apertures 6, 7. The groove 16 has an opening end 16a on the lateral surface 3b extending at right angles to the front side 3a of the cartridge main body 3 along which is moved the shutter member 8. By forming the groove 16 in this manner, the shutter opening member may be introduced into the groove from its opening end opened on the lateral surface 3b of the cartridge main body 3 for resiliently deflecting the locking arm 13b of the locking member 13 for unlocking shutter member 8 from its position of closing the apertures 6, 7 for moving the shutter member 8 in the direction of opening the apertures 6, 7.

Referring now to FIGS. 5 and 6, by arranging the disc cartridge D1 as described above, the shutter member 8 may be moved simply by providing the recording and/or reproducing apparatus with a convex-shaped shutter opening member introduced into the groove 16. That is, a convex-shaped shutter opening member is provided on the lateral side of a cartridge holder into which the disc cartridge D1 is introduced and held and which is adapted for loading the disc cartridge D1 into the disc rotating and driving device. The disc cartridge D1 is introduced into the cartridge holder, with the lateral side of the disc cartridge D1 having the opening end 16a of the groove 16 as an introducing end and with the direction of movement of the shutter member 8 as the introducing direction. In this manner, the disc cartridge D1 may be introduced into the groove 16 to permit the shutter member 8 to be moved in the direction of the opening the apertures 6 and 7 by the shutter member 8.

Meanwhile, the cartridge holder 20, provided with the shutter opening member 21 producing the movement of the shutter member 8 of the disc cartridge D1 and causing the disc cartridge D1 to be loaded in the disc rotating and driving device 22, is arranged within the recording and/or reproducing apparatus vertically movably with respect to the disc driving and rotating device.

When in an eject state permitting the disc cartridge D1 to be introduced therein, the cartridge holder 20 is maintained at an elevated position spaced from the disc table 23 of the disc rotating and driving device, as shown in FIG. 5. When the disc cartridge D1 is introduced into the cartridge holder 20, the cartridge holder is lowered towards the disc rotating and driving device 22. When the cartridge holder 20 is lowered towards the disc rotating and driving device 22, the disc cartridge D1 held by the cartridge holder 20 is also lowered towards the disc rotating and driving device 20. The disc table 23 of the disc rotating and driving device 22 is introduced at this time into the inside of the cartridge main body 3 via the opening 5, as shown in FIG. 6, and the disc 4 housed within the cartridge main body 3 is set on the disc table 23, at the same time that the disc 4 is clamped for rotation in unison with the disc table 23.

When the cartridge holder 20 is lowered towards the disc rotating and driving device 22, the disc cartridge D1 is supported by loading height position setting pins 25, and loading position setting pins 26, and by a cartridge thrusting rib 27 (shown in FIGS. 7 and 8) is mounted upright on a chassis base plate 24 within the recording and/or reproducing apparatus. One of the loading height setting pins 25 and one of the loading position setting pins 26 are not shown in FIGS. 5 and 6. The disc cartridge D1 is thrust and supported at this time by the loading height position setting pins 25 and the loading position setting pins 26 and by the cartridge thrusting rib 27 provided on an inner upper surface of the cartridge main body 3 facing an upper major surface 3c of the cartridge main body 3, as shown in FIG. 6. The disc cartridge D1, thrust by the cartridge holder 20 towards the disc rotating and driving device below and supported by the loading height position setting pins 25 and the loading position setting pins 26, is positioned in the vertical direction and in the horizontal direction and loaded in this state within the recording and/or reproducing apparatus. Meanwhile, the loading position setting pins 26, are engaged in positioning holes 17, 18 (shown in FIGS. 3 and 4) bored in the lower major surface 3d of the cartridge main body 3.

Meanwhile, if the disc cartridge D1, introduced into and held by the cartridge holder 20 and supported by the loading height setting pins 25 and the loading position setting pins 26 provided within the recording and/or reproducing apparatus, is to be loaded within the recording and/or reproducing apparatus by being positioned by the loading height position setting pins 25 and the loading position pins 26, it is necessary for the upper major surface 3c of the cartridge main body 3 to be positively thrust and supported by the cartridge thrusting rib 27 provided on the cartridge holder 20. Simultaneously it is also necessary for the disc cartridge D1 to be pressed and supported by the loading height setting pins 25 and the loading position setting pins 26 under the thrusting force exerted by the cartridge holder in the descending direction.

In order for the disc cartridge D1 to be pressed against and supported by the loading height setting pins 25 and the loading position setting pins 26 under the thrusting force exerted by the cartridge holder 20, it is necessary for the disc cartridge D1 to be supported by the loading height setting pins 25 and the loading position setting pins 26, while it is also necessary for the cartridge holder 20 to be moved subsequently in the descending direction.

When the disc cartridge D1, which is so arranged that the shutter opening member 21 is intruded into the groove 16 formed on the front surface 3a of the cartridge main body 3, is introduced into and held by the cartridge holder 20, the shutter opening member 21 has been introduced into the groove 16. Thus the groove 16 needs to be of such a width as to permit the cartridge holder 20 to descend in order to get the disc cartridge D1 to be pressed against and supported by the loading height setting pins 25 and the loading position setting pins 26.

That is, when the disc cartridge D1 is introduced into the cartridge holder 20 in its raised position and is not pressed against or supported by the loading height setting pins 25 or by the loading position setting pins 26, but is supported by a lower cartridge support 20a of the cartridge holder 20, as shown in FIG. 7, it is necessary to maintain a gap W1 between the shutter opening member 21 and a lower surface 16a of the groove 16 which is wide enough to permit the cartridge holder 20 to be lowered until the disc cartridge D1 is pressed against and supported by the loading height setting pins 25 and the loading position setting pins 26. By maintaining the gap W1 to permit the descent of the cartridge holder 20, the disc cartridge D1 is thrust and supported by the thrusting rib 27 and positioned by the height setting pins 25 and the loading position setting pins 26 so as to be loaded in the recording and/or reproducing apparatus Unless the gap W1 wide enough to permit the cartridge holder 20 to be lowered, is maintained between the shutter opening member 21 and the lower surface 16a of the groove 16, the shutter opening member 21 is abutted against the surface 16a of the groove 16 so that the disc cartridge D1 cannot be pressed by the thrusting rib 27 into pressure contact with the height setting pins 25 and the loading position setting pins 26. The result is that the disc cartridge D1 cannot be positioned within the cartridge holder 20 within the recording and/or reproducing apparatus.

In order for the disc cartridge D1 to be supported by the height setting pin 25 and the loading position setting pin 26, under the urging pressure in the descending direction of the cartridge holder 20, it is necessary that the gap W1, shown in FIG. 7, defined between the shutter opening member 21 and the surface 16a of the groove 16, be larger than the gap W2 between the upper major surface 3c of the cartridge main body 3 and the thrusting rib 27. For maintaining such magnitude relation between the gap W1 and W2, it is necessary to increase the width W3 of the groove 16.

However, if the width W3 of the groove 16 is increased, forward end parts 1a, 2a defining the groove 16 of the upper and lower halves 1, 2 of the cartridge main body 3 at least are reduced in thickness. If the disc cartridge D1 is subjected to impacts, such as by descent, the cartridge main body 3 may be damaged easily, so that the disc 4 accommodated therein cannot be protected sufficiently.

It may be contemplated to improve machining accuracy of the cartridge main body 3 and the cartridge holder 20 maintain the magnitude relation of the gap W1 between the shutter opening member 21 and the lower surface 16a of the groove 16 being larger than the gap W2 between the upper major surface 3c of the cartridge main body 3 and the cartridge thrusting rib 27 to reduce the width W3 of the groove 16 towards small a value as possible so as to provide the disc cartridge D1 having the cartridge holder 20 with a sufficient mechanical strength, with the forward ends 1a, 2a of the upper and lower halves 1, 2 defining the groove 16 each being of an increased thickness.

However, since the cartridge main body 3 of the disc cartridge D1 is made up of the upper half 1 and the lower half 2 which are molded of synthetic resin and which are abutted and connected to each other, it is extremely difficult to fabricate the cartridge main body 3 with extremely high dimensional accuracy.

The same may apply when the cartridge holder 21 is fabricated by a molded body of a synthetic resin.

SUMMARY OF THE INVENTION

It is, therefore, an object of the present invention to provide a disc cartridge which can be loaded in position on the cartridge loading section within the recording and/or reproducing apparatus.

It is another object of the present invention to provide a disc cartridge provided with a groove intruded into by a shutter opening member effecting the opening of the shutter member along the direction of movement of the shutter member, wherein the disc cartridge is improved in mechanical strength and the disc accommodated in the cartridge main body may be protected effectively.

It is still another object of the present invention to provide a disc cartridge which may be fabricated easily by molding synthetic resin.

For accomplishing the above objects, the present invention provides a disc cartridge comprising a cartridge main body accommodating a disc and having at least one apertures for radially exposing at least a part of the disc to the outside, a shutter member movably mounted on the cartridge main body for opening or closing the apertures, a groove formed in the cartridge main body along the direction of movement of the shutter member parallel to the direction of insertion of the disc cartridge into a recording and/or reproducing apparatus, the groove receiving the shutter opening means of the recording and/or reproducing apparatus adapted for opening the shutter member and means for generating a clearance between the groove and the shutter opening means when the shutter member is moved by the shutter opening means to the open aperture position.

In the disc cartridge according to the present invention, when the shutter member is moved to the open position by the shutter opening member which is introduced into the groove formed in the cartridge main body along the direction of movement of the shutter member, the shutter opening member reaches a position facing the clearance formed within the groove and is positioned on the widest portion within the groove.

Consequently, when the shutter member has been moved into the position of opening the signal recording/reproducing apertures, the maximum stroke of relative movement between the cartridge main body and the shutter opening member in the direction of the thickness of the cartridge main body may be assured.

In the above-described disc cartridge according to the present invention, since the clearance is formed at a position in register with the position of the shutter member, the shutter member is moved to the position of opening the apertures by the shutter opening member introduced into the groove formed in the cartridge main body. This allows for extending in the direction of movement of the shutter member, a maximum stroke of relative movement between the cartridge main body and the shutter opening member along the direction of movement of the cartridge main body when the shutter member has been moved to the position of opening the recording/reproducing apertures. The result is that the machining tolerance may be taken up and the cartridge main body may be positively pressed against and supported by the height setting pins and the loading position setting pins so as to be loaded in position on the cartridge loading unit within the recording and/or reproducing apparatus.

Since the clearance is formed only in part of the groove formed in the cartridge main body, the groove need not be enlarged in size so that mechanical strength of the cartridge main body may be assured to achieve reliable disc protection.

By providing the above clearance, the machining error of the disc cartridge positioned and supported by the height setting pins and the loading position setting pins may be taken up and the disc cartridge may be loaded in position to facilitate the fabrication of the cartridge main body by molding the synthetic resin.

BRIEF DESCRIPTION OF THE DRAWING

The invention will be more readily understood with reference to the accompanying drawing, wherein.

DESCRIPTION OF THE INVENTION

Figure 1:
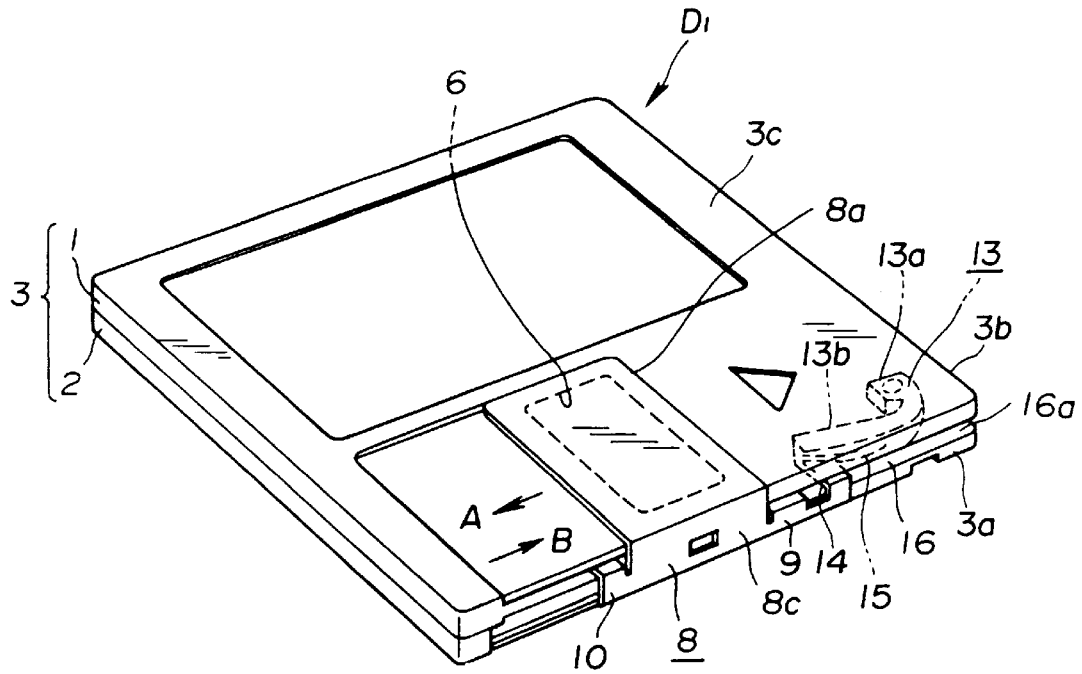
FIG. 1 is a perspective view showing a disc cartridge from which the present invention is started, as seen from the upper major surface of the disc cartridge, with the recording/reproducing apertures being closed.
Figure 2:
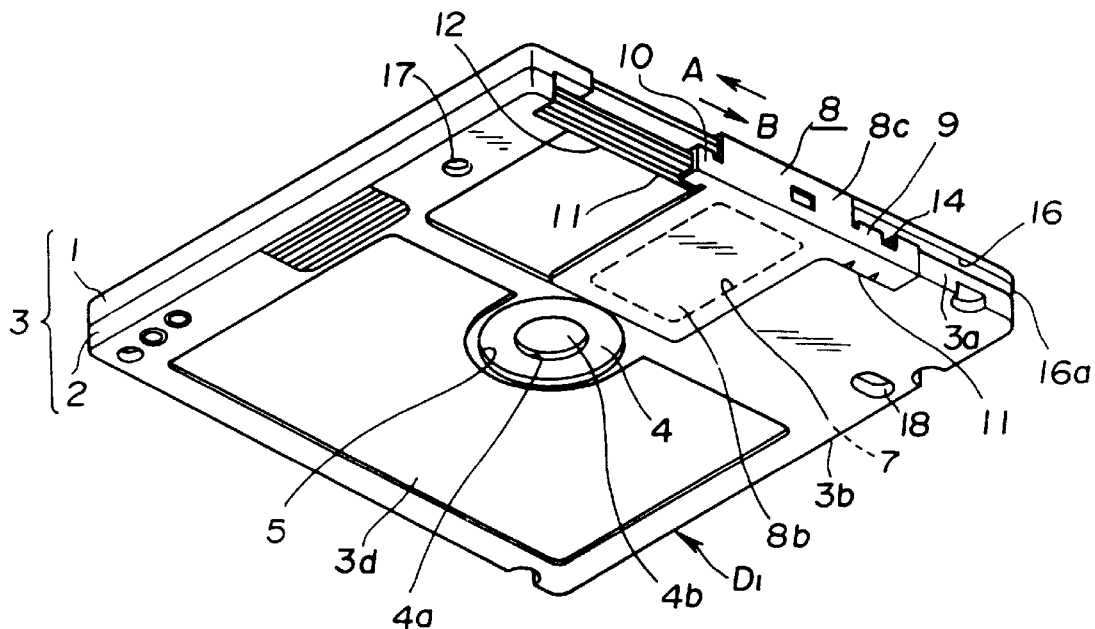
FIG. 2 is a perspective view from the lower surface of the disc cartridge shown in FIG. 1, with the recording/reproducing apertures being opened.
Figure 3:
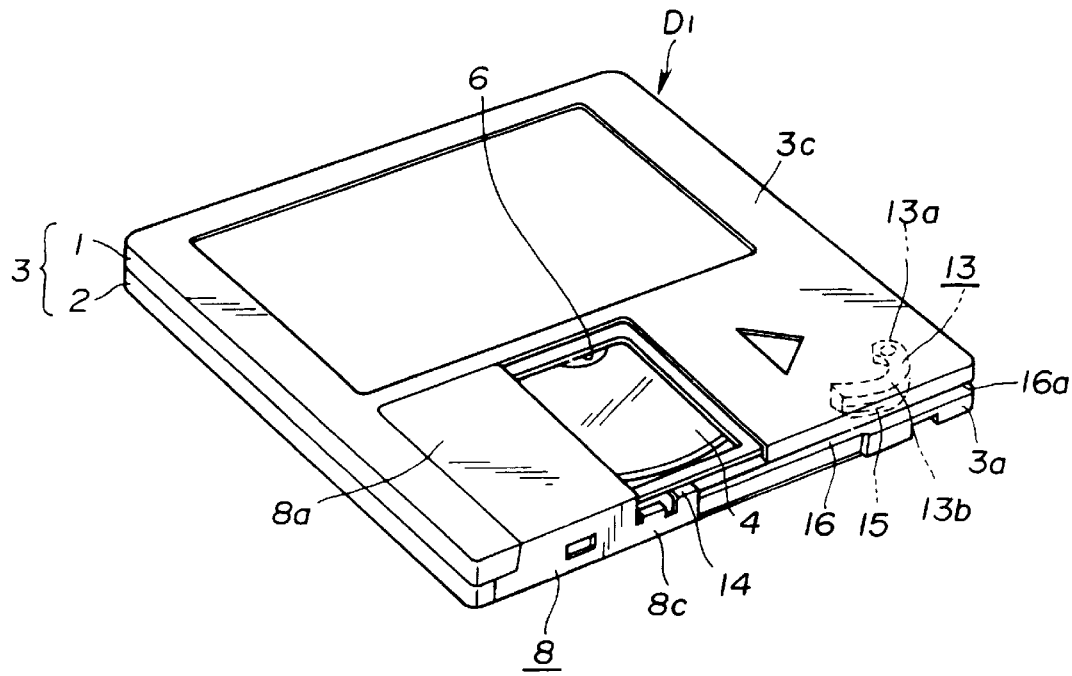
FIG. 3 is a perspective view of the disc cartridge shown in FIG. 1, as seen from the upper major surface thereof, with the recording/reproducing apertures being opened.
Figure 4:
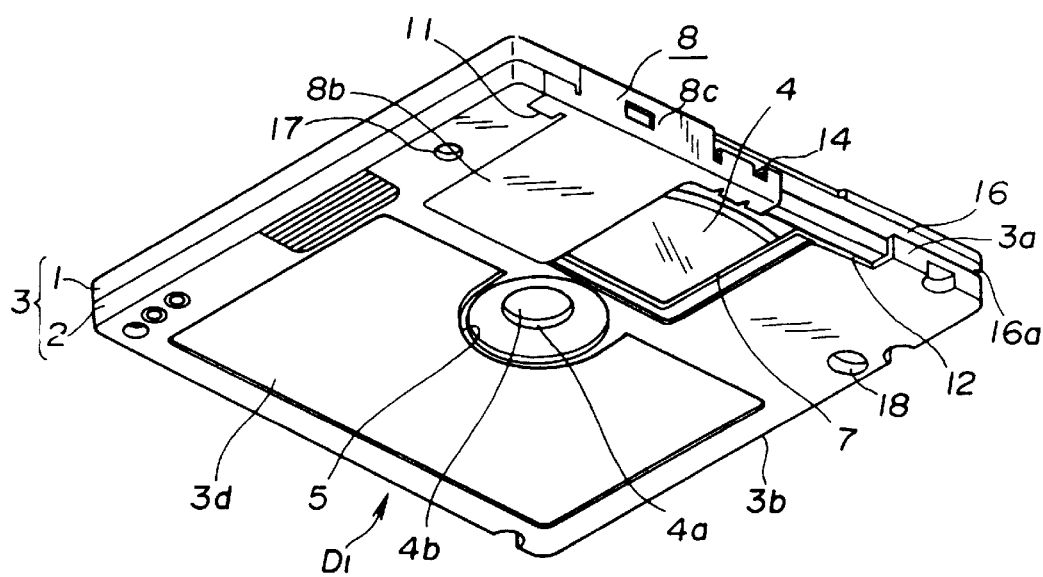
FIG. 4 is a perspective view of the disc cartridge shown in FIG. 1, as seen from the lower major surface thereof, with the recording/reproducing apertures being opened.
Figure 5:
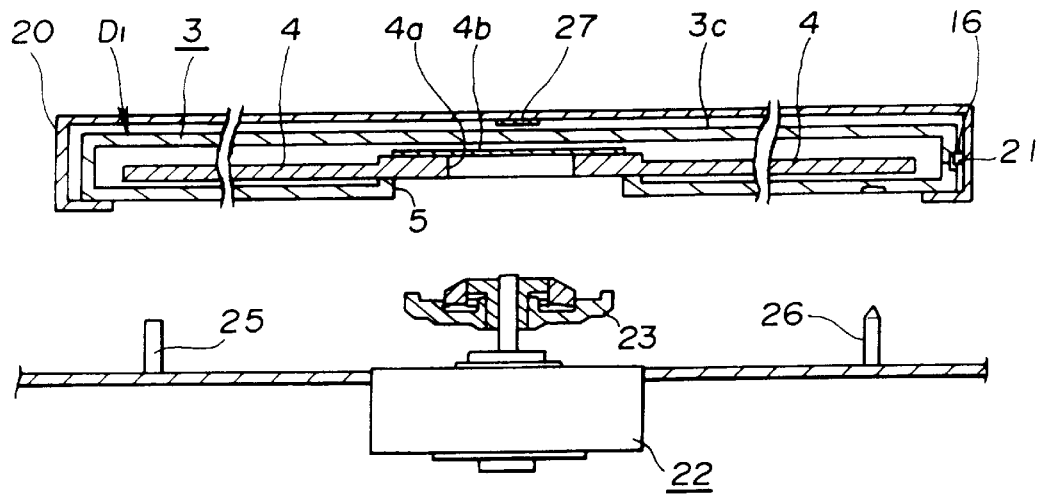
FIG. 5 is a schematic front view for illustrating the state in which the disc cartridge shown in FIG. 1 is introduced into the cartridge holder which is in the ejection position.

Referring to the drawings, certain preferred embodiments of the present invention will be explained in detail.

Figure 9:
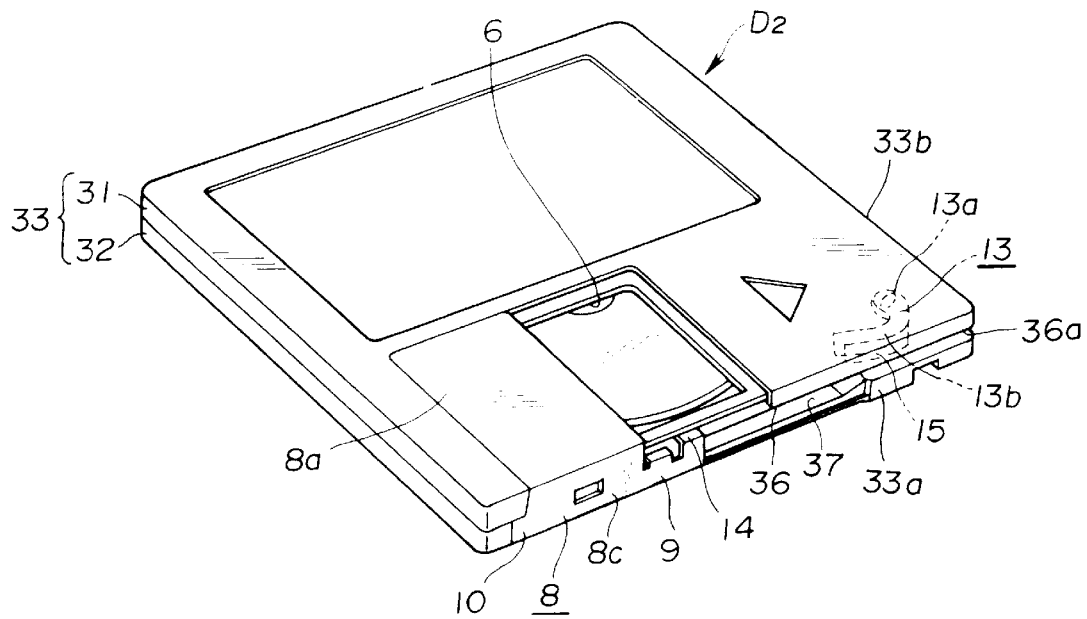
FIG. 9 is a perspective view of a disc cartridge according to the present invention from the upper major surface of the disc cartridge, with the recording/reproducing apertures being opened.
Figure 10:
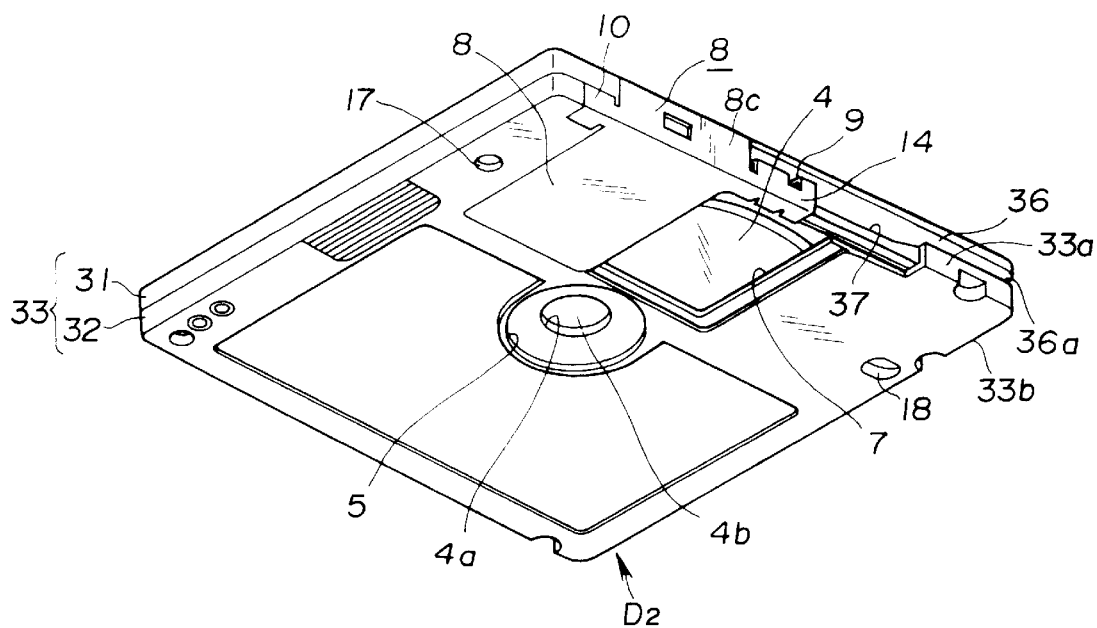
FIG. 10 is a perspective view of a disc cartridge according to the present invention from the upper major surface of the disc cartridge, with the recording/reproducing apertures being opened.
Figure 11:
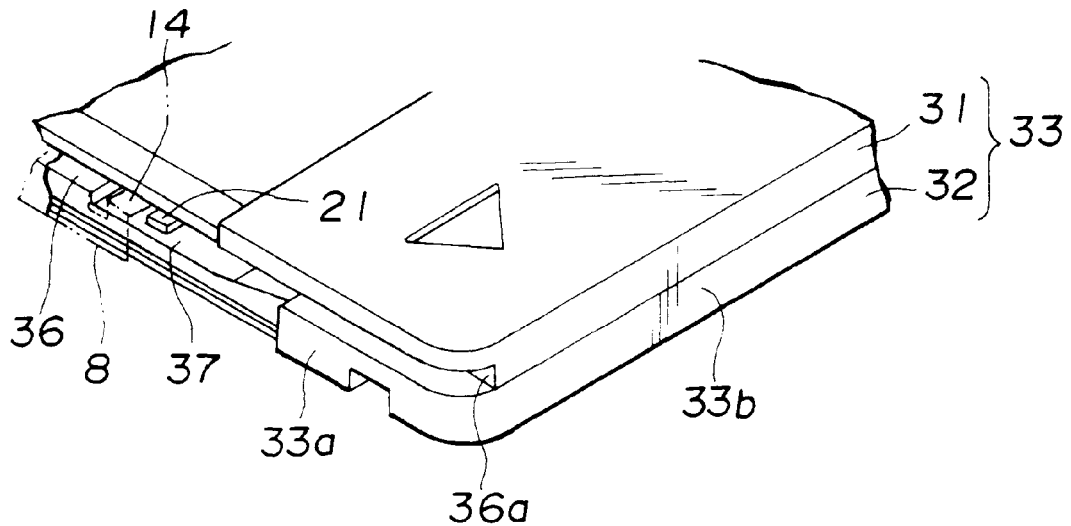
FIG. 11 is an enlarged perspective view showing the groove and its neighborhood in the cartridge main body of the disc cartridge according to the present invention.
Figure 12:
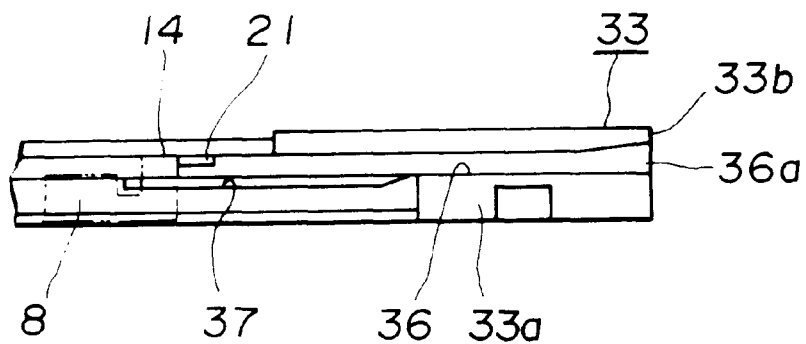
FIG. 12 is an enlarged front view showing the groove and its neighborhood in the cartridge main body of the disc cartridge according to the present invention.

Referring to FIGS. 9 and 10, a disc cartridge D2 according to the present invention includes a cartridge main body 33 made up of the an upper half 31 and a lower half 32 molded from synthetic resin and abutted and connected to each other, and a disc 4, such as an optical disc or a magneto-optical disc for recording information signals, is rotatably accommodated within the cartridge main body 33.

In the above-mentioned disc cartridge D2, the cartridge main body 33 is formed with an opening 5 into which a disc table is to be inserted, and signal recording/reproducing apertures 6, 7. A shutter member 8, similar to that attached to the disc cartridge D1, is movably mounted to the cartridge main body 33.

A locking member 13 is provided within the cartridge main body 33 for maintaining the shutter member 8 in the position of closing the signal recording/reproducing apertures 6, 7 when the shutter member 8 has reached the closing position.

Since the basic construction of the cartridge main body 33 and the construction of the shutter member 8 provided on the cartridge main body 33 and the locking member 13 adapted for maintaining the shutter member 8, in the position of closing the signal recording/reproducing apertures, is the same in the present disc cartridge D2 as in the previously described disc cartridge D1, the same numerals are used to depict the same parts and the corresponding description is omitted for simplicity.

Similarly, in the above-described disc cartridge D1, the cartridge main body 33 of the disc cartridge D2 of the present invention is provided with a groove 36 on the front side of the cartridge main body 33 along which the shutter member 8 is moved. The groove 36 is adapted for unlocking the locking member 13 and locking the shutter member 8 in the aperture closing position and for being the engaged by a shutter opening member arranged in the recording and/or reproducing apparatus for moving the shutter member 8 in the direction of the signal recording/reproducing apertures 6, 7. The groove 36 has an opening end 36a on a lateral surface 33b extending at right angles to the front side 33a of the cartridge main body 33 along which the shutter member 8 is moved.

Meanwhile, in the disc cartridge D2 according to the present invention, a clearance 37 is formed in the groove 36 for evading the shutter opening member 21 of the recording and/or reproducing apparatus introduced in to the groove 36. The clearance 37 is provided at a position in register with the shutter opening member 20 when the disc cartridge D2 is introduced into the cartridge holder 20 of the recording and/or reproducing apparatus for moving the shutter member 8 by the shutter opening member 21 provided on the cartridge holder 20 to the position of opening the signal recording/reproducing apertures 6, 7, as shown in FIGS. 9 and 10.

Referring to FIGS. 11, 12, 13 and 14, the clearance 37 is formed by partially removing, in the form of a recess, the forward end of the lower half 32 of the cartridge main body 33 defining the groove 36 and facing the upper half 31. The clearance 37 ends at the rising surface 37a as an inclined surface, the shutter opening member 21 which has intruded into the groove 36 for moving the shutter member 8 to the position of the opening the apertures 6, 7 may be smoothly moved towards the opening end 36a before exiting the groove 36.

Meanwhile, the clearance 37 is just wide enough to accommodate the shutter opening member 21, which has caused the shutter member 8 to be moved to the position of opening the apertures 6, 7, so that it is only necessary to remove the groove partially in the form of the recess.

When the disc cartridge D2, having the groove 36 in which the clearance 37 is formed, is introduced into the cartridge holder 20 placed in the ejection position, with the lateral side 33b having the opening end 36a of the groove 36 as an entrance end, the shutter opening member 21 is introduced into the groove 36, as shown in the case of the above-mentioned disc cartridge D1, the shutter opening member 21 causing the locking arm 13b of the locking member 13 to be resiliently deflected for releasing the locking at the aperture closing position of the shutter member 8. When the disc cartridge D2 is further introduced into the inside of the cartridge holder 20, the shutter member 8 is moved by the shutter opening member 21 towards the position of opening the apertures 6, 7 for opening the apertures 6, 7. The disc cartridge D2 is introduced into and held by the cartridge holder in the position. When the disc cartridge D2 is introduced into and held by the cartridge holder 20, with the signal recording/reproducing apertures 6, 7 opened, the shutter opening member is positioned facing the clearance 37 in the groove 36.

Figure 6:
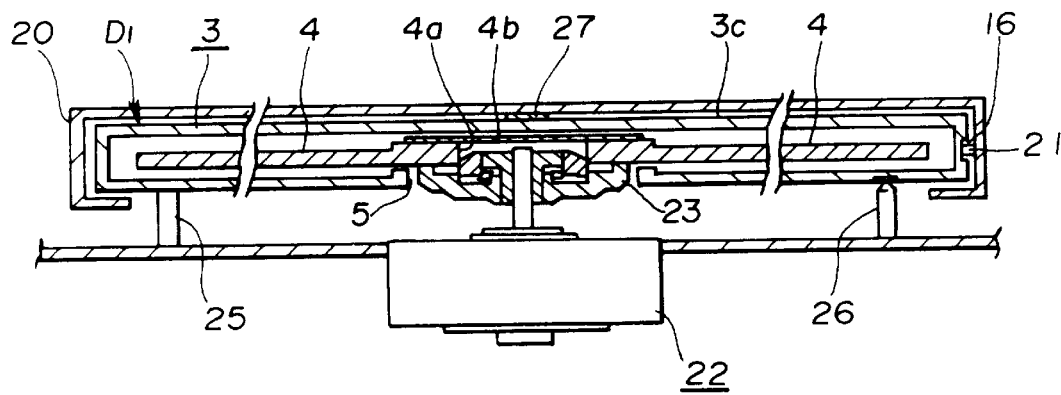
FIG. 6 is a schematic front view for illustrating the state in which the disc cartridge shown in FIG. 1 is introduced into and held by the cartridge holder and loaded on a cartridge loading unit within the recording and/or reproducing apparatus.
Figure 7:
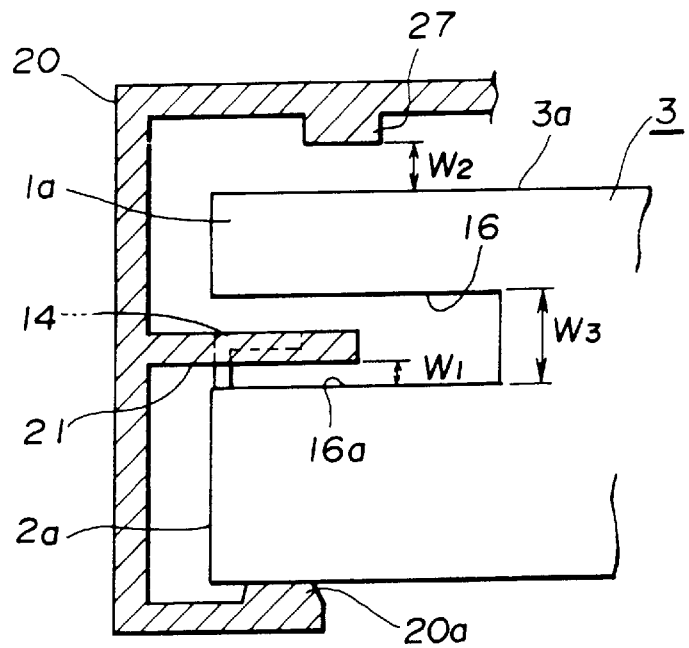
FIG. 7 is a schematic side view showing the relation between the groove and the shutter opening member in a state in which the disc cartridge is introduced into the cartridge holder in the ejection position.
Figure 8:
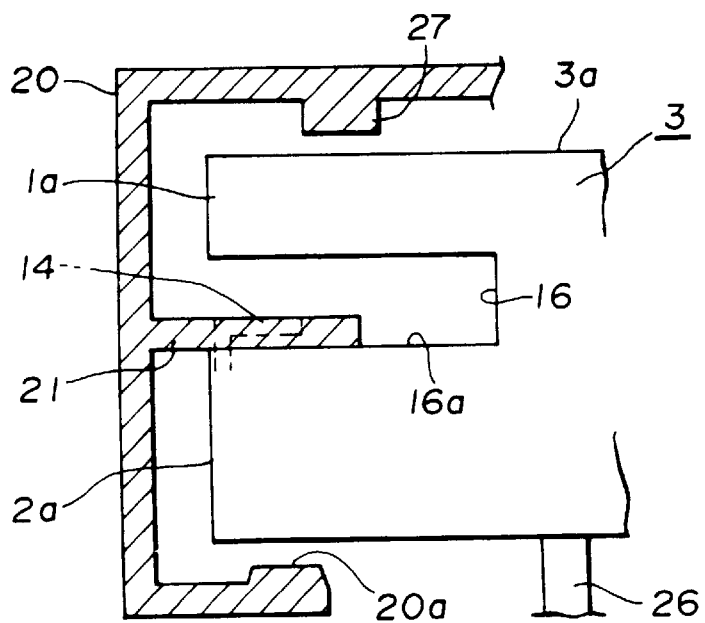
FIG. 8 is a schematic side view showing the relation between the groove and the shutter opening member in state in which the disc cartridge is introduced into and held by the cartridge holder and loaded on a cartridge loading unit within the recording and/or reproducing apparatus.

If, after the disc cartridge D2 is introduced into and held by the cartridge holder 20, the cartridge holder 20 is lowered from the raised ejection position towards the disc rotating and driving device 20, the disc table 23 of the disc rotating and driving device 22 is inserted into the inside of the cartridge main body 33 via the disc table entrance opening 5. As described previously in connection with FIG. 6, the disc 4 housed within the cartridge main body 33 is set on the disc table 23 and clamped thereto for rotation in unison with the disc table 23.

Meanwhile, when the disc cartridge holder 20 is lowered towards the disc rotating and driving device 22, the disc cartridge D2 is supported by the loading height setting pins 25 and the loading position setting pins 26. The disc cartridge D2 is pressed against and supported by the loading height setting pins 25 and the loading setting pins 26 and by the cartridge thrusting rib 27 provided on the upper inner lateral surface of the cartridge holder 20 facing the upper major surface 33c of the cartridge main body 33. The loading setting pins and the cartridge thrusting rib simultaneously press on the disc cartridge so that the disc cartridge D2 is loaded within the recording and/or reproducing apparatus with correct positioning in the vertical and in the horizontal direction.

Meanwhile, when the disc cartridge D2 according to the present invention is introduced into and held by the cartridge holder 20, with the shutter member 8 being moved to the position of opening the recording/reproducing apertures,the shutter opening member 21 of the cartridge holder 20 faces the clearance 37 within the groove 36.

Figure 13:
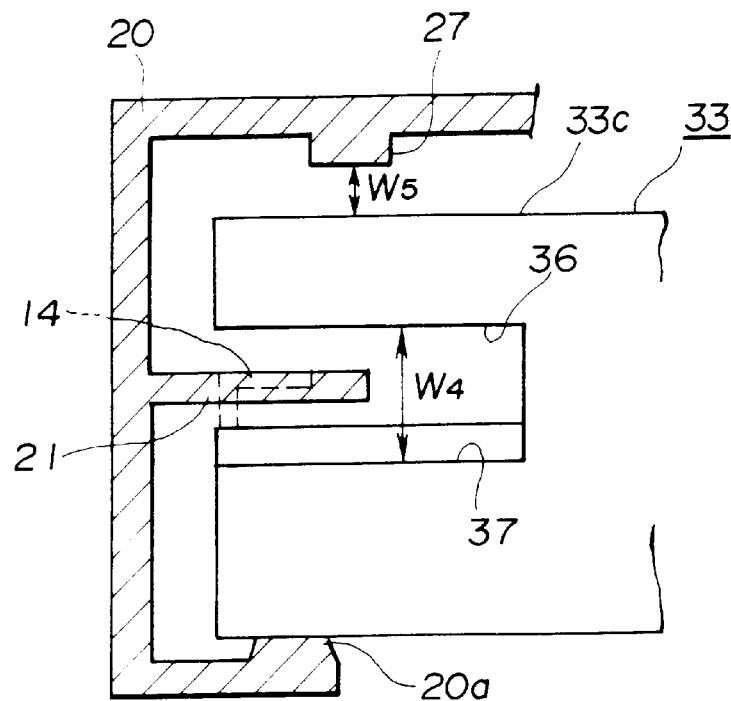
FIG. 13 is a schematic side view for illustrating the state in which the disc cartridge according to the present invention is introduced into the cartridge holder which is in the ejection position.
Figure 14:
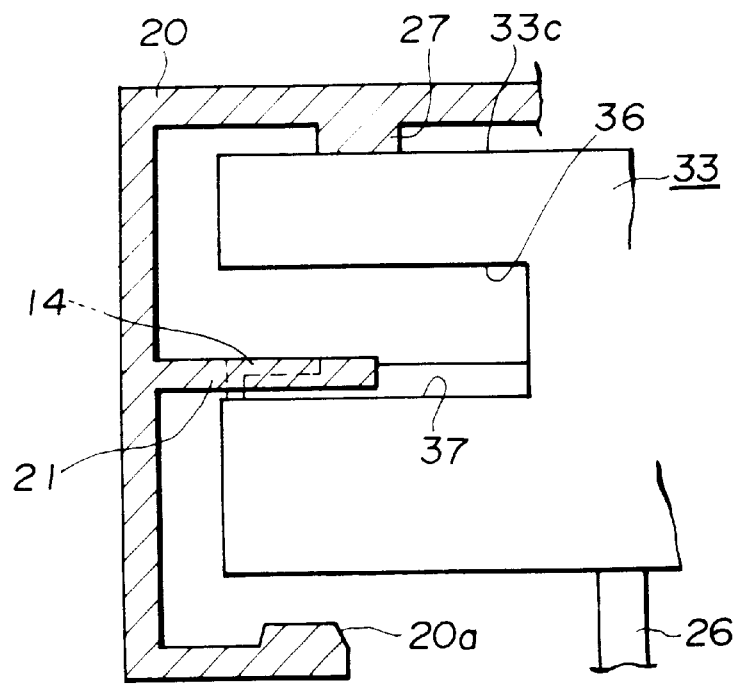
FIG. 14 is a schematic side view for illustrating the state in which the disc cartridge according to the present invention is introduced into and held by the cartridge holder and loaded on the cartridge loading unit within the recording and/or reproducing apparatus.

In this manner, a gap W4 wide enough to permit descent of the cartridge holder 20 to get the disc cartridge D2 to be pressed against and supported by the loading height setting pins 25 and the loading position setting pins 26 is maintained between the shutter opening member 21 and the clearance 37 within the groove 36, as shown in FIG. 13.

With the disc cartridge D2 introduced into the cartridge holder 20 which is in the raised position, as shown in FIG.

13, the gap W4, wider than the gap W5 between the upper major surface 33c of the cartridge main body 33 and the cartridge thrusting rib 27, is maintained between the shutter opening member 21 and the clearance 37 within the groove 36.

By maintaining the above-mentioned magnitude relation between the gaps W4 and W5, the movement stroke of the cartridge holder 20 in the descending direction allows the disc cartridge D2 to be pressed against and supported by the loading height setting pins 25 and the loading position setting pins 26. In this manner, any disc cartridge susceptible to machining tolerance may be positively maintained in position by the loading height setting pins 25 and the loading position setting pins 26.

What is claimed is:

1. A disc cartridge comprising:
    a cartridge main body accommodating a disc and having at least one aperture for radially exposing a portion of the disc;
    a shutter member movably mounted on the cartridge main body for opening or closing the aperture;
    a groove formed in the cartridge main body along the direction of movement of the shutter member parallel to the direction of insertion of the cartridge main body into a recording and/or reproducing apparatus, the groove receiving a shutter opening means of the recording and/or reproducing apparatus adapted for opening the shutter member; and
    means for increasing a clearance between the groove and the shutter opening means when the shutter member is moved to open the aperture.

2. A disc cartridge according to claim 1, wherein the clearance means is provided in the lateral portion of the cartridge main body, the lateral portion of the cartridge main body is formed of the groove.

3. A disc cartridge according to claim 2, wherein the clearance means is a wide portion of the groove, the wide portion of the groove is wider than another portion of the groove.

4. A disc cartridge comprising:
    a cartridge main body accommodating a disc and having at least one of aperture for radially exposing at least a part of said disc to outside;
    a shutter member movably mounted on said cartridge main body for opening and closing said aperture; and
    a groove formed in said cartridge main body along the direction of movement of said shutter member parallel to the direction of insertion of the disc cartridge into a recording and/or reproducing apparatus, said groove receiving a shutter opening means of the recording and/or reproducing apparatus adapted for opening said shutter member, said groove comprising a first and a second groove portion, said first groove portion for introducing the shutter opening means, said second groove portion being wider than said first groove portion, said second groove portion being formed in register with the open position of said shutter member.

5. A disc cartridge according to claim 4, wherein said second groove portion generates a clearance between said groove and the shutter opening means when said shutter member is moved by the shutter opening means to open said aperture.

* * * * *